US012258877B2

(12) United States Patent
Loimayr et al.

(10) Patent No.: US 12,258,877 B2
(45) Date of Patent: Mar. 25, 2025

(54) SUPERCHARGER ASSEMBLY

(71) Applicant: BRP-ROTAX GMBH & CO. KG, Gunskirchen (AT)

(72) Inventors: Hubert Loimayr, Hartkirchen (AT); Markus Wolfsgruber, Neukirchen bei Altmuenster (AT); Paul Allmann, Linz (AT); Rudolf Kusel, Wels (AT); Rudolf Tscherne, Buchkirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/421,033

(22) Filed: Jan. 24, 2024

(65) Prior Publication Data

US 2024/0254895 A1 Aug. 1, 2024

Related U.S. Application Data

(60) Provisional application No. 63/442,136, filed on Jan. 31, 2023.

(51) Int. Cl.
*F01D 25/18* (2006.01)
*F01D 25/04* (2006.01)
*F02B 37/00* (2006.01)

(52) U.S. Cl.
CPC ............. *F01D 25/18* (2013.01); *F01D 25/04* (2013.01); *F02B 37/00* (2013.01); *F05D 2220/40* (2013.01); *F05D 2260/40* (2013.01); *F05D 2260/96* (2013.01); *F05D 2260/98* (2013.01)

(58) Field of Classification Search
CPC .......... F01D 25/18; F01D 25/04; F02B 37/00; F05D 2220/40; F05D 2260/40; F05D 2260/96; F05D 2260/98
See application file for complete search history.

(56) References Cited

U.S. PATENT DOCUMENTS

| | | | | |
|---|---|---|---|---|
| 4,844,044 | A * | 7/1989 | McGovern | F04C 29/06 464/57 |
| 4,944,279 | A * | 7/1990 | Woodard | F04C 29/005 464/65.1 |
| 5,281,116 | A * | 1/1994 | Gwin | F04C 29/005 418/94 |
| 6,880,536 | B2 * | 4/2005 | Pratley | F02B 39/14 184/6.16 |
| 7,299,792 | B1 * | 11/2007 | Jones | F02B 39/14 184/6.12 |
| 7,966,817 | B2 * | 6/2011 | Schenck | F02B 41/10 184/6.12 |
| 9,631,563 | B2 * | 4/2017 | Venton-Walters | F02B 33/36 |
| 10,578,011 | B2 * | 3/2020 | Naruoka | F01D 25/186 |

(Continued)

*Primary Examiner* — Jesse S Bogue
(74) *Attorney, Agent, or Firm* — BCF LLP

(57) ABSTRACT

A supercharger assembly has a supercharger housing defining an air inlet and an air outlet; an impeller disposed in the supercharger housing; an impeller shaft connected to the impeller for driving the impeller; a driveshaft connected to the impeller shaft for driving the impeller shaft, the driveshaft defining an oil supply passage; and a torsional damper connected to the driveshaft for driving the driveshaft. The torsional damper is configured for being operatively connected to a crankshaft of an internal combustion engine. The oil supply passage is positioned to supply oil to the torsional damper for lubricating the torsional damper.

20 Claims, 12 Drawing Sheets

(56) References Cited

U.S. PATENT DOCUMENTS

| | | | | |
|---|---|---|---|---|
| 10,947,894 | B2 * | 3/2021 | Niwa | F01M 11/02 |
| 11,383,812 | B1 | 7/2022 | Tscherne et al. | |
| 2023/0167858 | A1 * | 6/2023 | Mineo | F16D 3/12 464/66.1 |

* cited by examiner

SUPERCHARGER ASSEMBLY

CROSS-REFERENCE

The present application claims priority to U.S. Provisional Patent Application No. 63/442,136, filed Jan. 31, 2023, the entirety of which is incorporated herein by reference.

TECHNICAL FIELD

The present technology relates to supercharger assemblies of internal combustion engines.

BACKGROUND

It is known that boosting the pressure of the air being fed to an internal combustion engine increases the power output of the engine and/or reduces fuel consumption. One mechanism used to boost the air pressure is a supercharger. One type of supercharger is a centrifugal supercharger. A centrifugal supercharger has a supercharger housing, which is typically volute-shaped, inside which an impeller rotates.

The impeller is driven from the crankshaft of the engine via a drive assembly, the design of which can vary from one engine to another. The combination of the supercharger and the drive assembly is referred to herein as a supercharger assembly. The impeller can often rotate at speeds exceeding 100,000 rotations per minute (RPM). Various mechanisms, such as gear assemblies, are used to increase the input rotation speed of the crankshaft in order to reach the high output rotation speed corresponding to the speed of rotation of the impeller. This means that components of the drive assembly will rotate slower than the impeller, but will still rotate much faster than the crankshaft. This high speed of rotation proves to be a challenge for lubricating these fast turning components as any oil applied to these components is almost immediately ejected due to the high centrifugal forces.

Also, in internal combustion engines, the speed of rotation of the crankshaft is not constant, with speed peaks following combustion events. It is desirable to prevent these speed variations from being transmitted to the impeller. To achieve this, a torsional damper can be provided in the drive assembly. However, if the torsional damper is not properly lubricated, it could wear prematurely.

Therefore, there is a desire for a way of lubricating components of a supercharger assembly that can overcome at least some of the above-described drawbacks.

SUMMARY

It is an object of the present technology to ameliorate at least some of the inconveniences present in the prior art.

According to one aspect of the present technology, there is provided a supercharger assembly having: a supercharger housing defining an air inlet and an air outlet; an impeller disposed in the supercharger housing; an impeller shaft connected to the impeller for driving the impeller; a driveshaft connected to the impeller shaft for driving the impeller shaft, the driveshaft defining an oil supply passage; and a torsional damper connected to the driveshaft for driving the driveshaft. The torsional damper is configured for being operatively connected to a crankshaft of an internal combustion engine. The oil supply passage is positioned to supply oil to the torsional damper for lubricating the torsional damper.

In some embodiments, the supercharger assembly also has a sleeve disposed around a portion of the torsional damper. The portion of the torsional damper is disposed radially between the sleeve and the driveshaft. The sleeve is positioned to intercept oil escaping from the torsional damper.

In some embodiments, the torsional damper has: a driving member configured for being operatively connected to the crankshaft of the internal combustion engine; and a driven member engaging the driving member, the driven member being connected to the driveshaft. The driving member and the driven member are rotationally movable relative to each other. The driving member and the driveshaft are rotationally movable relative to each other. The driven member is rotationally fixed to the driveshaft.

In some embodiments, the driveshaft extends through the driving member.

In some embodiments, a plain bearing is disposed radially between the driveshaft and the driving member. The driveshaft defines another oil supply passage. The other oil supply passage is positioned to supply oil to the plain bearing for lubricating the plain bearing.

In some embodiments, a hollow fastener is fastened to an end of the driveshaft and extends in the driveshaft. The hollow fastener defines an oil supply passage for supplying oil to the other oil supply passage.

In some embodiments, a first bearing is connected to the driveshaft. The driving member is disposed axially between the first bearing and the driven member. A second bearing is connected to the driveshaft. The driven member is disposed axially between the second bearing and the driving member.

In some embodiments, a friction disc is disposed axially between the driving member and the first bearing. The driveshaft defines another oil supply passage. The other oil supply passage is positioned to supply oil to the friction disc for lubricating the friction disc.

In some embodiments, a hollow fastener is fastened to an end of the driveshaft and extends in the driveshaft. The hollow fastener defines an oil supply passage for supplying oil to the other oil supply passage.

In some embodiments, a cover is disposed over an end of the driveshaft. The cover defines an oil chamber fluidly connected to an oil pump of the internal combustion engine to receive pressurized oil from the oil pump. The driveshaft defines an axial passage fluidly communicating the oil chamber with the oil supply passage to supply oil from the oil chamber to the oil supply passage.

In some embodiments, a bearing is connected radially between the end of the driveshaft and the cover for rotationally supporting the end of the driveshaft in the cover.

In some embodiments, a hollow fastener is fastened to the end of the driveshaft and extending in the axial passage of the driveshaft. The hollow fastener has a head. The driveshaft defines a step. The bearing is held axially between the head of the fastener and the step of the driveshaft.

In some embodiments, the driveshaft defines at least one other oil supply passage for supplying oil to at least one other component of the supercharger assembly. The hollow fastener defines at least one oil supply passage for fluidly communicating the oil chamber with the at least one other oil supply passage.

In some embodiments, the driven member is axially movable relative to the driveshaft and relative to the driving member. A biasing member biases the driven member axially toward the driving member.

In some embodiments, the biasing member is at least one disc spring.

In some embodiments, the sleeve is connected to the driving member, and is axially and rotationally fixed relative to the driving member.

In some embodiments, the driveshaft has external splines. The driven member has internal splines engaging the external splines. The oil supply passage supplies oil to an interface between the internal splines and the external splines.

In some embodiments, one of the driving member and the driven member defines a plurality of recesses. Another one of the driving member and the driven member defines a plurality of arms received in the plurality of recesses. The plurality of arms slide along surfaces of the plurality of recesses as the driven member rotates relative to the driving member. The sleeve is disposed around the plurality of recesses and the plurality of arms.

In some embodiments, the recesses of the plurality of recesses are arcuate recesses. The arms of the plurality of arms have arcuate ends.

In some embodiments, the arcuate ends of the arms have a smaller radius of curvature than the arcuate recesses.

In some embodiments, the driving member defines the plurality of recesses. The driven member defines the plurality of arms. The driven member is disposed axially between the driving member and the impeller.

In some embodiments, the driving member defines a plurality of gear teeth.

In some embodiments, a planetary gear assembly operatively connects the driveshaft to the impeller shaft.

In some embodiments, the planetary gear assembly has a ring gear. A flange connects an end of the driveshaft to a radially inner side of the ring gear.

According to another aspect of the present technology, there is provided an internal combustion engine having: at least one piston; a crankshaft operatively connected to the piston; and the supercharger assembly according to any one of the above. The crankshaft is operatively connected to the torsional damper.

In some embodiments, an oil pump is operatively connected to the crankshaft. The oil pump supplies oil to the oil supply passage.

In some embodiments, the supercharger assembly also has a sleeve disposed around a portion of the torsional damper. The portion of the torsional damper is disposed radially between the sleeve and the driveshaft. The sleeve is positioned to intercept oil escaping from the torsional damper.

In the context of the present specification, unless expressly provided otherwise, the words “first”, “second”, “third”, etc. have been used as adjectives only for the purpose of allowing for distinction between the nouns that they modify from one another, and not for the purpose of describing any particular relationship between those nouns.

It must be noted that, as used in this specification and the appended claims, the singular form “a”, “an” and “the” include plural referents unless the context clearly dictates otherwise.

As used herein, the term “and/or” is to be taken as specific disclosure of each of the two specified features or components with or without the other. For example “A and/or B” is to be taken as specific disclosure of each of (i) A, (ii) B and (iii) A and B, just as if each is set out individually herein.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
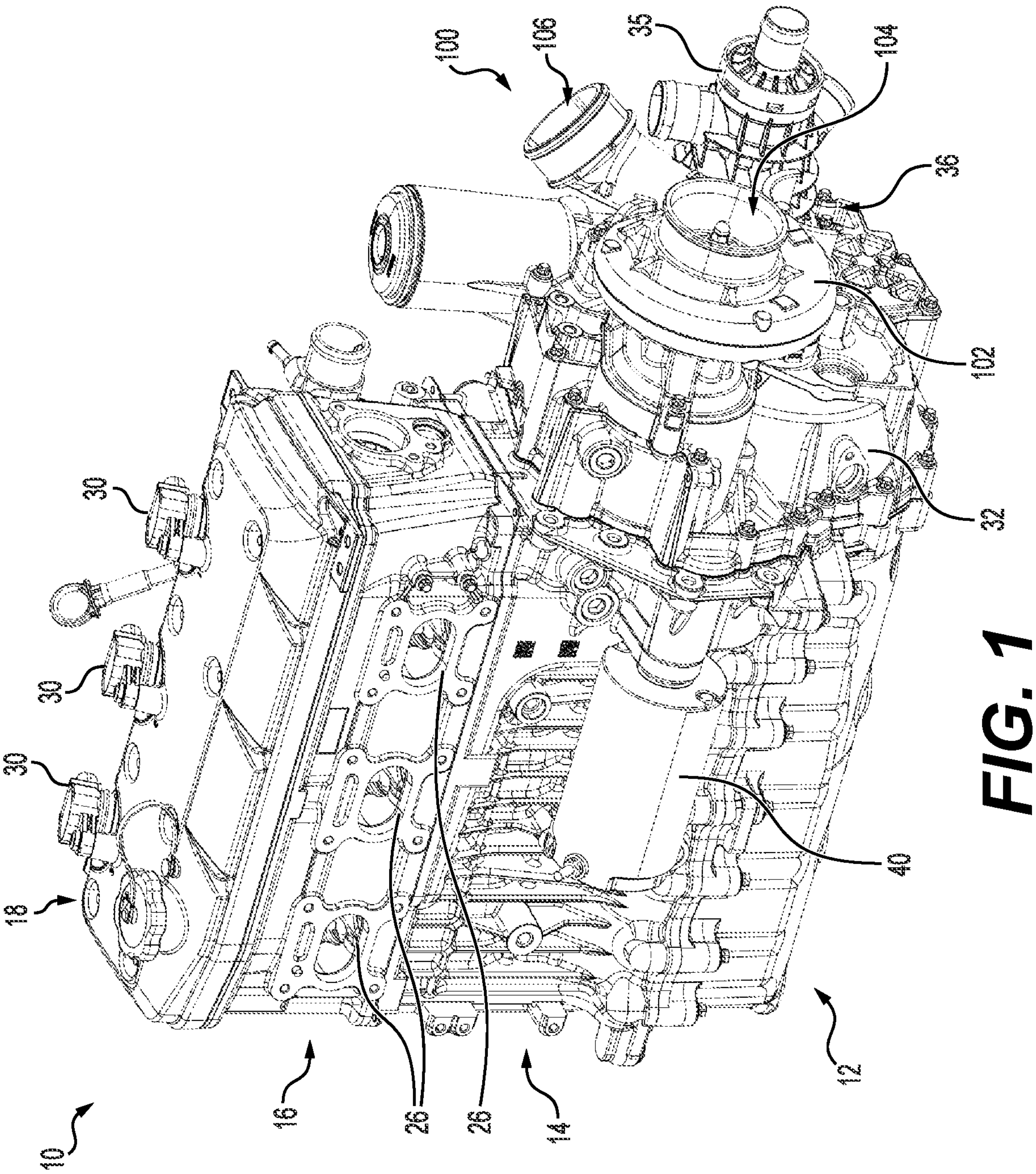
FIG. 1 is a perspective view taken from a rear, left side of an internal combustion engine.
Figure 2:
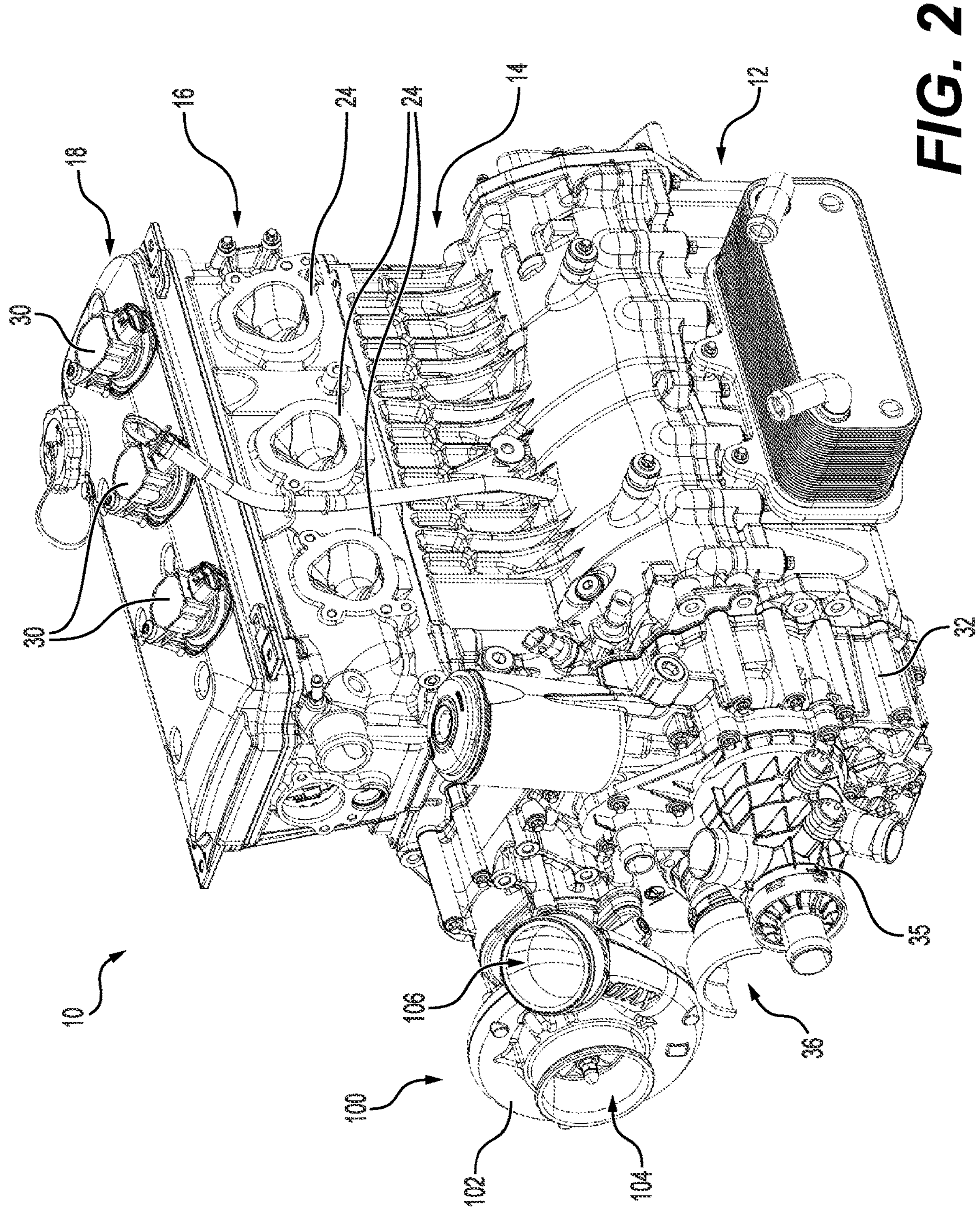
FIG. 2 is a perspective view taken from a rear, right side of the engine of FIG. 1.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of “including”, “comprising”, or “having”, “containing”, “involving” and variations thereof herein, is meant to encompass the items listed thereafter as well as, optionally, additional items. In the following description, the same numerical references refer to similar elements.

Figure 3:
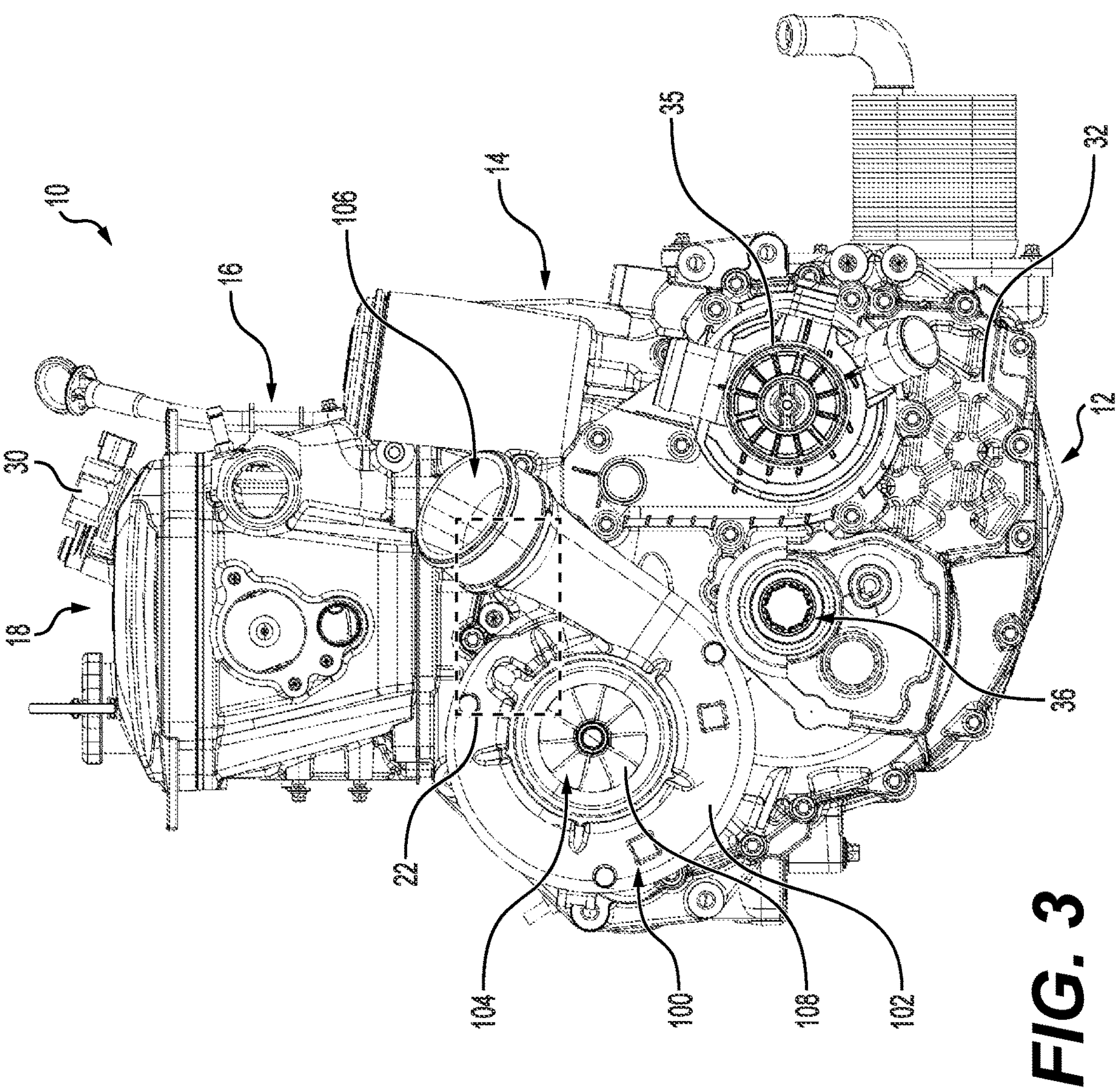
FIG. 3 is a rear elevation view of the engine of FIG. 1.
Figure 4:
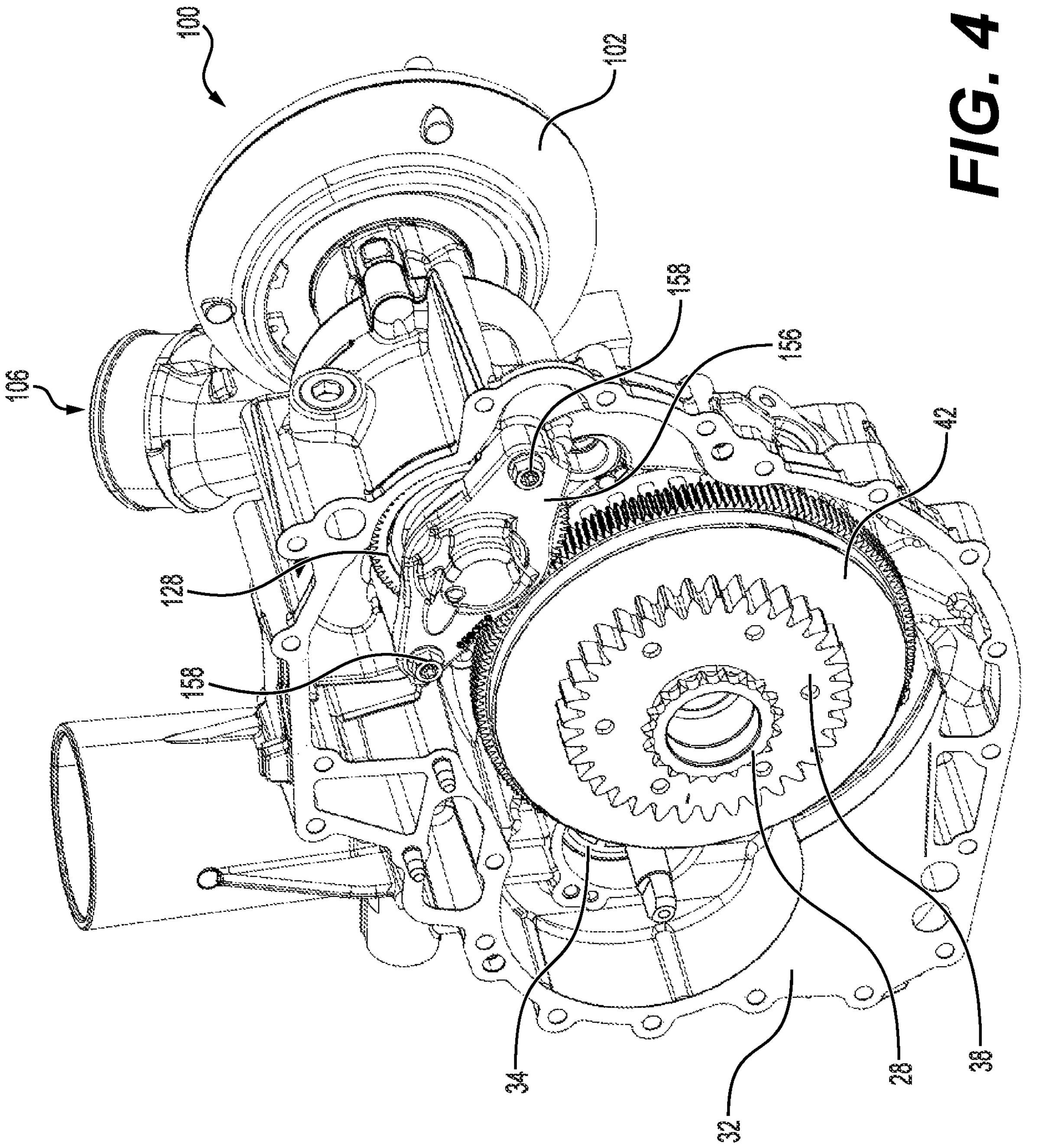
FIG. 4 is a perspective view taken from a front, left side of a rear cover, gears and a supercharger assembly of the engine of FIG. 1.
Figure 5:
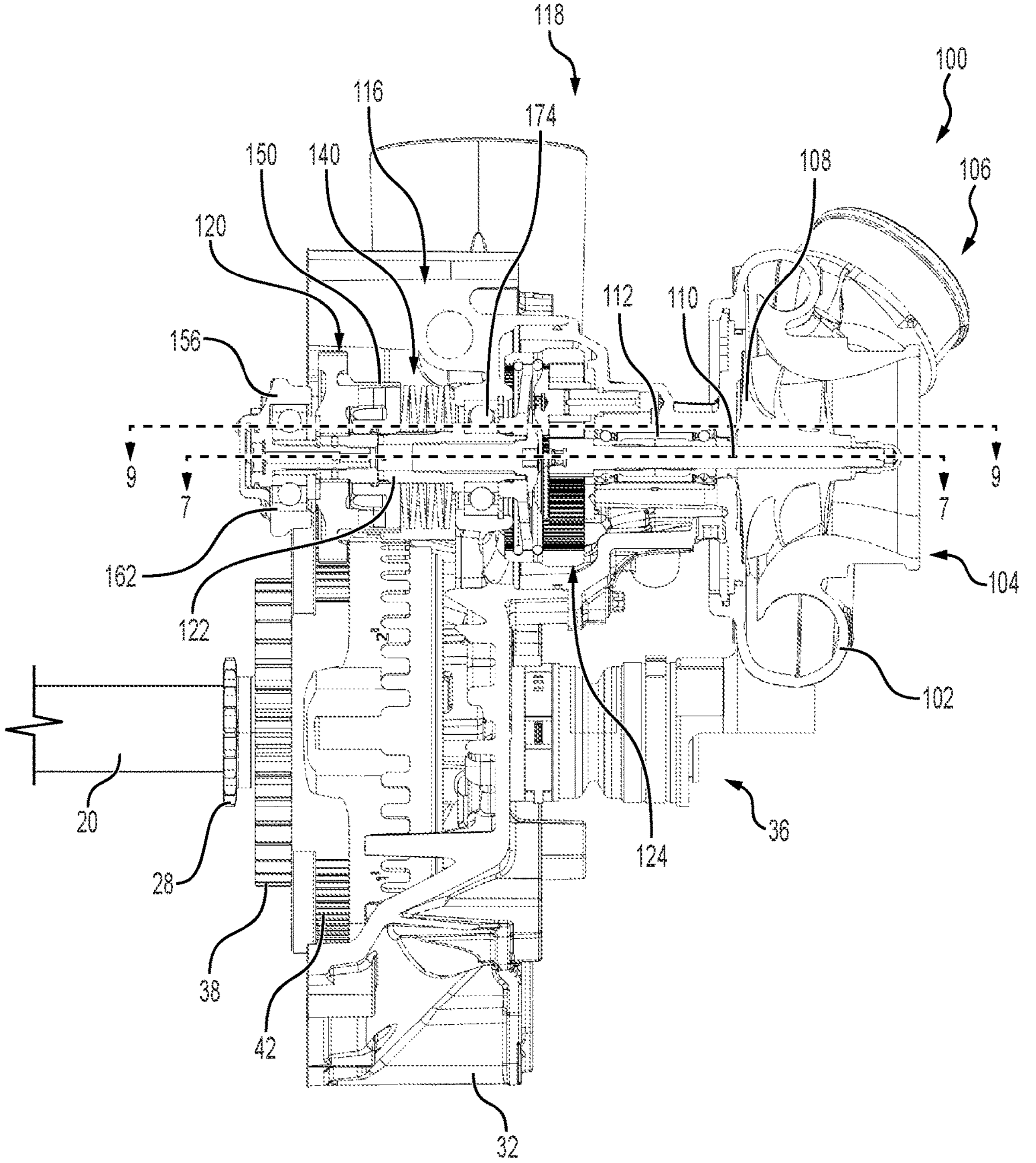
FIG. 5 is a cross-section of the components of FIG. 4 taken through line 5-5 of FIG. 7.

An internal combustion engine 10 in accordance with the present technology will be described with reference to FIGS. 1 to 5. The engine 10 is a four-stroke engine, but it is contemplated that the engine 10 could be of another type, such as a two-stroke engine for example. The engine 10 has a crankcase 12, a cylinder block 14 disposed on top of the crankcase 12, a cylinder head 16 disposed on top of the of the cylinder block 14, and a valve cover 18 disposed on top of the of the cylinder head 16. The crankcase 12 and the cylinder block 14 rotationally support a crankshaft 20 (FIG. 5). The cylinder block 14 and cylinder head 16 define three cylinders (not shown) inside which pistons 22 (one of which is schematically shown in FIG. 3) are disposed. It is contemplated that the engine 10 could have more or less than three cylinders with a corresponding number of pistons 22. The pistons 22 are connected to the crankshaft 20 by connecting rods (not shown) to drive the crankshaft 14.

The cylinder head 16 defines three air intake ports 24 for supplying air to the cylinders and three exhaust ports 26 for exhausting exhaust gases from the cylinders. The cylinder head 16 also houses intake and exhaust valves (not shown) for opening and closing the passage of gas through the air intake ports 24 and the exhaust ports 26. The intake and exhaust valves are opened and closed by cams (not shown) disposed on a camshaft (not shown). The crankshaft 20 drives a sprocket 28 (FIG. 4), which drives a timing chain (not shown), which drives another sprocket (not shown) connected to the end of the camshaft, which drives the camshaft. Fuel injectors (not shown) supply fuel in the cylinders. Spark plugs 30, supported by the valve cover 18 and the cylinder head 16, extend into the cylinders to ignite the air-fuel mixture in the cylinders.

The engine 10 also has a rear housing 32 mounted to the back of the crankcase 12 and the cylinder block 14. The rear housing 32 supports an oil pump 34 (FIG. 4), a water pump 35, a power take-off (PTO) assembly 36, and a supercharger 100. The supercharger 100 and its operative connection to the crankshaft 20 will be described in more detail below.

The PTO assembly 36 is connected to the rear end of the crankshaft 20 and is driven by the crankshaft 20. The PTO assembly is configured to operatively connect to and drive one or more components to be driven by the engine 10, such as a propeller or a jet propulsion unit of a watercraft, or the wheels of an on-road or off-road vehicle for example. It should be understood that although in the present embodiment the engine 10 is oriented such that the crankshaft 20 extends longitudinally and the PTO assembly 36 is connected to the rear end of the crankshaft 20, it is contemplated that in some embodiments the engine 10 could be oriented such that the PTO assembly 36 is connected to the front end of the crankshaft 20, such that the crankshaft 20 extends laterally, such that the crankshaft 20 extends vertically, or such that the crankshaft 20 has some other orientation.

The oil pump 34 is a mechanical oil pump operatively connected to and driven by the crankshaft 20 to supply oil to the various components of the engine 10. More specifically, with reference to FIG. 4, the crankshaft 20 drives a gear 38 mounted on the crankshaft 20, which drives a gear (not shown) mounted to a counterbalance shaft (not shown), and the counterbalance shaft drives the oil pump 34. The counterbalance shaft is parallel to the crankshaft 20. The counterbalance shaft and the crankshaft 20 rotate in opposite directions. It is contemplated that in some embodiments, the oil pump 34 could be an electric oil pump.

A starter motor 40 is connected to the cylinder block 14. The starter motor 40 selectively engages a gear 42 (FIG. 4) mounted to the crankshaft 20. With the engine 10 stopped, the starter motor 40 engages and drives the gear 42, thereby turning the crankshaft 20 and moving the pistons 22. While the gear 42 turns, fuel injection and ignition is initiated and the starter motor 40 disengages the gear 42 once the engine has started.

The supercharger 100 will now be described in more detail. The supercharger 100 has a supercharger housing 102. As can be seen, the supercharger housing 102 has a volute-shaped portion in the present embodiment. The supercharger housing 102 has a rearwardly facing air inlet 104 and an air outlet 106. The air outlet 106 is fluidly connected to an air intake system (not shown) of the engine 10 for supplying pressurized air to the air intake ports 24. As can be seen in FIG. 5, an impeller 108 is disposed in the impeller housing 102. As the impeller 104 rotates, air is drawn through the air inlet 104, is compressed by the combined action of the impeller 108 and the impeller housing 102 and is expelled by the air outlet. The impeller 108 is connected to an impeller shaft 110. The impeller shaft 110 is rotationally supported in the impeller housing 102 by a ball bearing 112. It is contemplated that is some embodiments, the ball bearing 112 could be replaced by a plain bearing. The impeller shaft 110 rotates about an impeller shaft axis 114 (FIG. 6) The impeller shaft 110 drives the impeller 108. The impeller shaft 110 is driven by a drive assembly 116 described in detail below. The supercharger 100 and the drive assembly 116 together form a supercharger assembly 118.

With reference to FIGS. 6, 8, 10, 11 and 12, the drive assembly 116 includes a torsional damper 120, a driveshaft 122 and a planetary gear assembly 124. The torsional damper 120 operatively connects the crankshaft 20 to the driveshaft 122 to drive the driveshaft 122. The driveshaft 122 rotates about a driveshaft axis 126. The driveshaft axis 126 is coaxial with the impeller shaft axis 112. For purposes of the description that follows, the axial and radial directions are defined relative to the driveshaft axis 126. The planetary gear assembly 124 operatively connects the driveshaft 122 to the impeller shaft 110 to drive the impeller shaft 110. It is contemplated that in some embodiments the planetary gear assembly 124 could be replaced by some other type of assembly to transfer torque from the driveshaft 122 to the impeller shaft 110 such that the impeller shaft 110 turns faster than the driveshaft 122. It is contemplated that in some such embodiments, the impeller shaft axis 112 could no longer be coaxial with the driveshaft axis 126, but that the impeller shaft axis 112 could be parallel to the driveshaft axis 126. In the present embodiment, the planetary gear assembly 124 is disposed axially between the torsional damper 120 and the impeller 108.

The torsional damper 120 has a driving member 128 and a driven member 130. The driving member 128 and the driven member 130 are rotationally movable relative to each other such that the torsional damper 120 can dampen the torque variations of the crankshaft 20. In the present embodiment, the driven member 130 is disposed axially between the driving member 128 and the impeller 108. It is contemplated that in an alternative embodiment, the driving member 128 could be disposed axially between the driven member 130 and the impeller 108.

The driveshaft 122 extends through the driving member 128. A plain bearing 132 is disposed radially between driveshaft 122 and the driving member 128 such that the driving member 128 can move rotationally relative to the driveshaft 122. The driving member 128 is axially fixed. The driving member 128 defines a plurality of gear teeth 134. The gear teeth 134 engage the teeth of the gear 42 (see FIG. 4) such that the crankshaft 20 drives the driving member 128.

Figure 12:
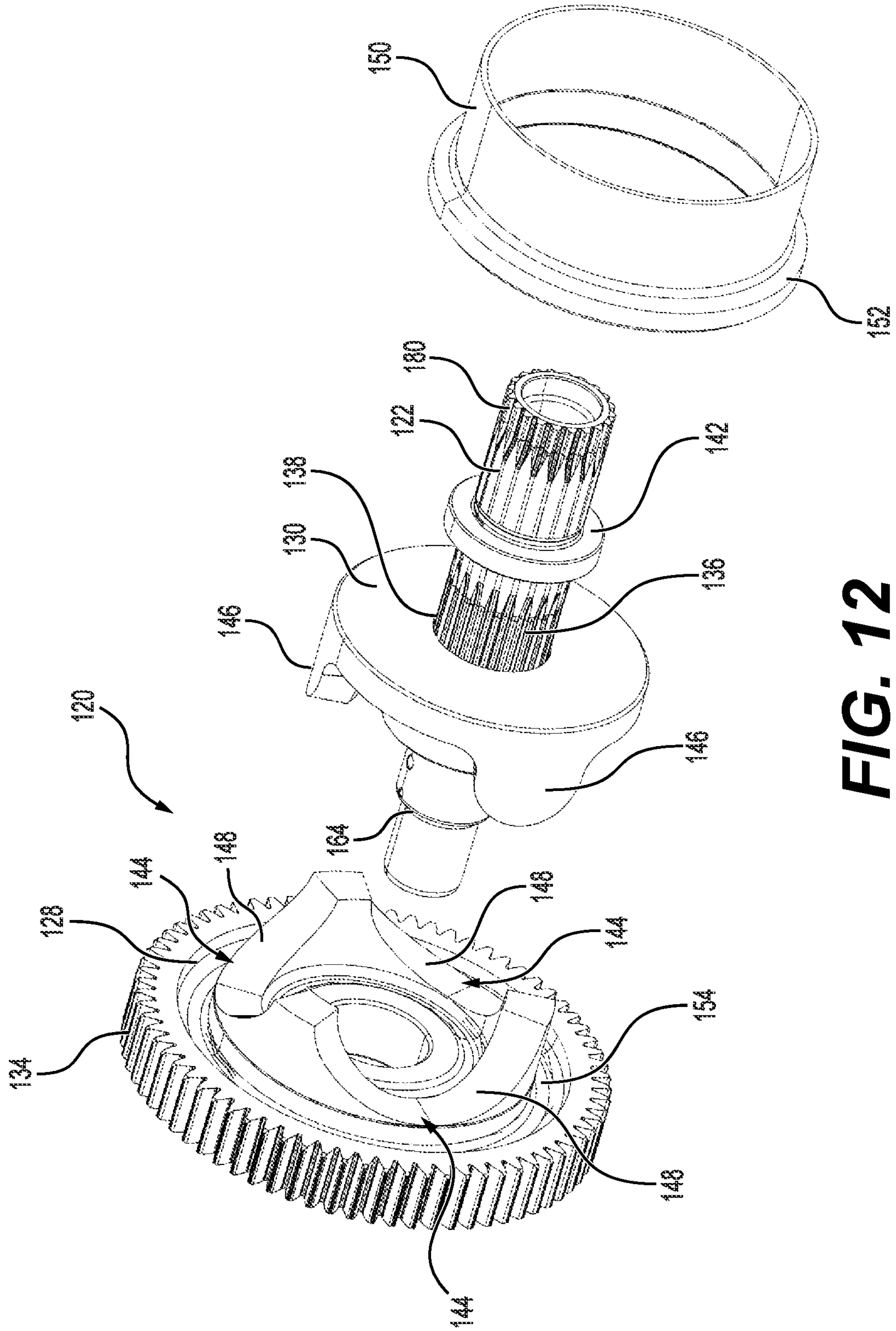
FIG. 12 is a partially exploded perspective view taken from a rear, left side of a torsional damper, a driveshaft and a sleeve of the supercharger assembly of FIG. 4.

The driveshaft 122 also extends through the driven member 130. The driveshaft 122 has external splines 136 (FIG. 12). The driven member 130 has internal splines 138 engaging the external splines 136. As such, the driven member 130 is rotationally fixed to the driveshaft 122 and is axially movable relative to the driveshaft 122 and relative to the driving member 128. Six disc springs 140 bias the driven member 130 axially toward the driving member 128. The frontmost disc spring 140 abuts the rear side of the driven member 130. The rearmost disc spring 140 abuts a flange 142 defined by the driveshaft 122. It is contemplated that other embodiments could have more or less disc springs 140. It is also contemplated that other embodiments could use a biasing member other than disc springs 140, such as a coil spring or an elastomeric member for example. It is also contemplated that in alternative embodiment, the torsional damper 120 could be of a type where the driven member 130 is axially fixed.

With reference to FIG. 12, the driving member 128 defines three recesses 144 and the driven member 130 defines three arms 146 (only two of which are visible in this figure). The arms 146 are received in the recesses 144. It is contemplated that there could be more or less than three recesses 144 with a corresponding number of arms 146. It is also contemplated that in an alternative embodiment, the driving member 128 defines the arms 146 and the driven member 130 defines the recesses 144. As can be seen, the recesses 144 are arcuate recesses 144 and the ends of the arms 146 are arcuate ends. The arcuate ends of the arms 146 have a smaller radius of curvature than the arcuate recesses 144. As the driven member 130 rotates relative to the driven member 128, such as in response to torque variations from the crankshaft 20, the ends of the arms 146 slide along the surfaces 148 of the recesses 144 causing the driven member 130 to move axially along the driveshaft 122 relative to the driving member 128. The disc springs 140 keep the ends of the arms 146 in contact with the surfaces 148 of the recesses 144.

Figure 11:
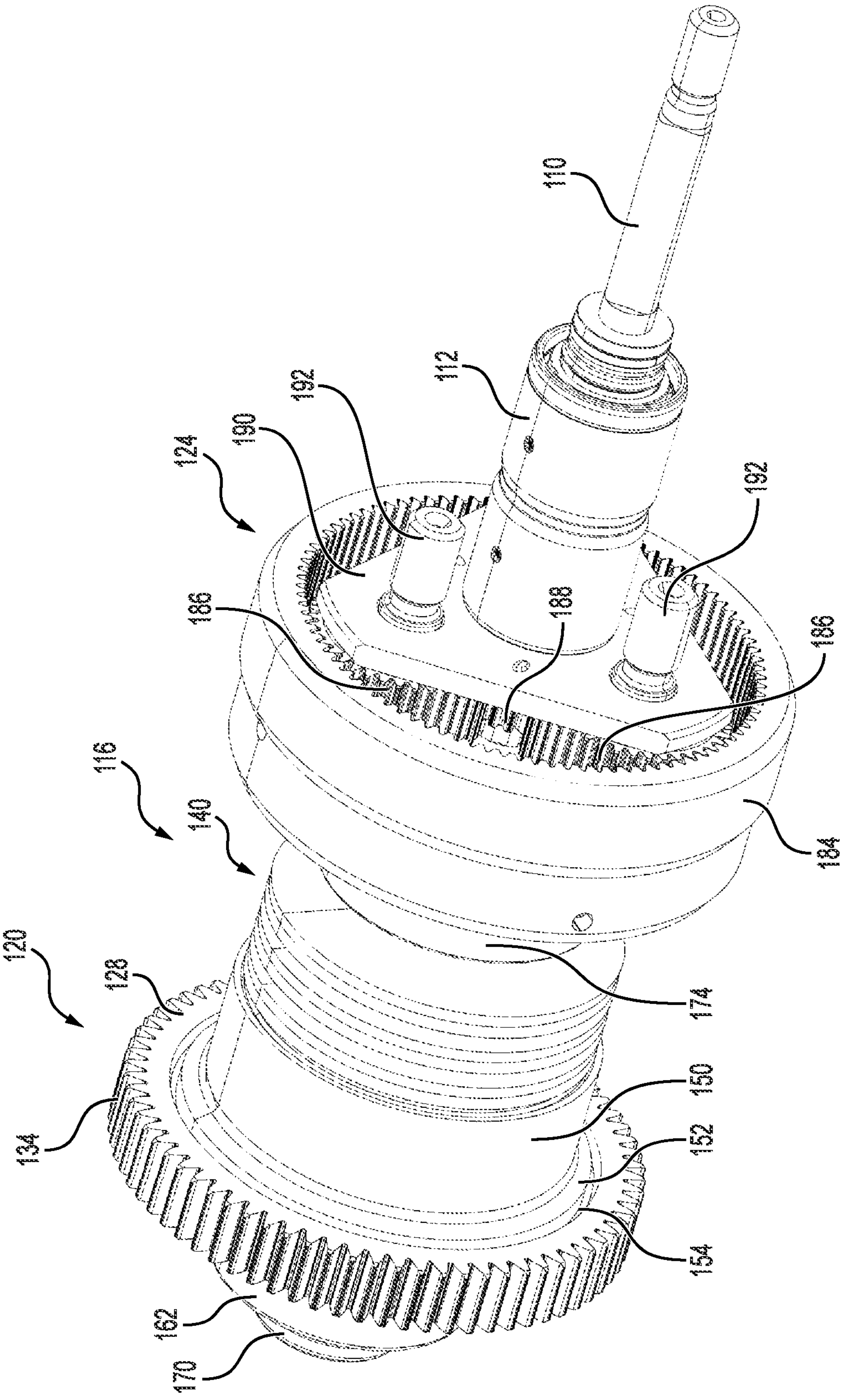
FIG. 11 is a perspective view taken from a rear, left side of the components of FIG. 10, with the impeller and a supercharger housing removed.

As best seen in FIG. 11, a sleeve 150 is dispose around a portion of the torsional damper 120. As such, this portion of the torsional damper 120 is disposed radially between the sleeve 150 and the driveshaft 122. More specifically, in the present embodiment the sleeve 150 is disposed around the recesses 144 and the arms 146. The sleeve 150 is sufficiently long to cover any space between the driving member 128 and the driven member 130 when the driven member 130 is at its axially furthest position relative to the driving member 128. As will be described in more detail below, the sleeve 150 is positioned to intercept oil supplied to the torsional damper 120 for lubricating the torsional damper 120 and that escapes from the torsional damper 120 due to the centrifugal forces generated by the rotating torsional damper 120. The sleeve 150 is connected to the driving member 128 such that the sleeve 150 is axially and rotationally fixed relative to the driving member 128. The driven member 130 can slide axially in the sleeve 150 and can rotate relative to the sleeve 150. With reference to FIGS. 11 and 12, in the present embodiment, the sleeve 150 has a flange 152 that is press-fit inside a groove 154 defined in the driving member 128. It is contemplated that the sleeve 150 could be connected to the driving member 128 in other ways, such as by an adhesive or by fasteners. It is also contemplated that in an alternative embodiment, the sleeve 150 is connected to the driven member 130 such that the sleeve 150 is axially and rotationally fixed relative to the driven member 130. It is contemplated that in some embodiments, the sleeve 150 could be omitted.

A cover 156 is disposed over a front end of the driveshaft 122. As best seen in FIG. 4, the cover 156 is fastened to the rear housing 32 by two threaded fasteners 158. The cover 156 defines, in part, an oil chamber 160 (see FIG. 6).

Figure 6:
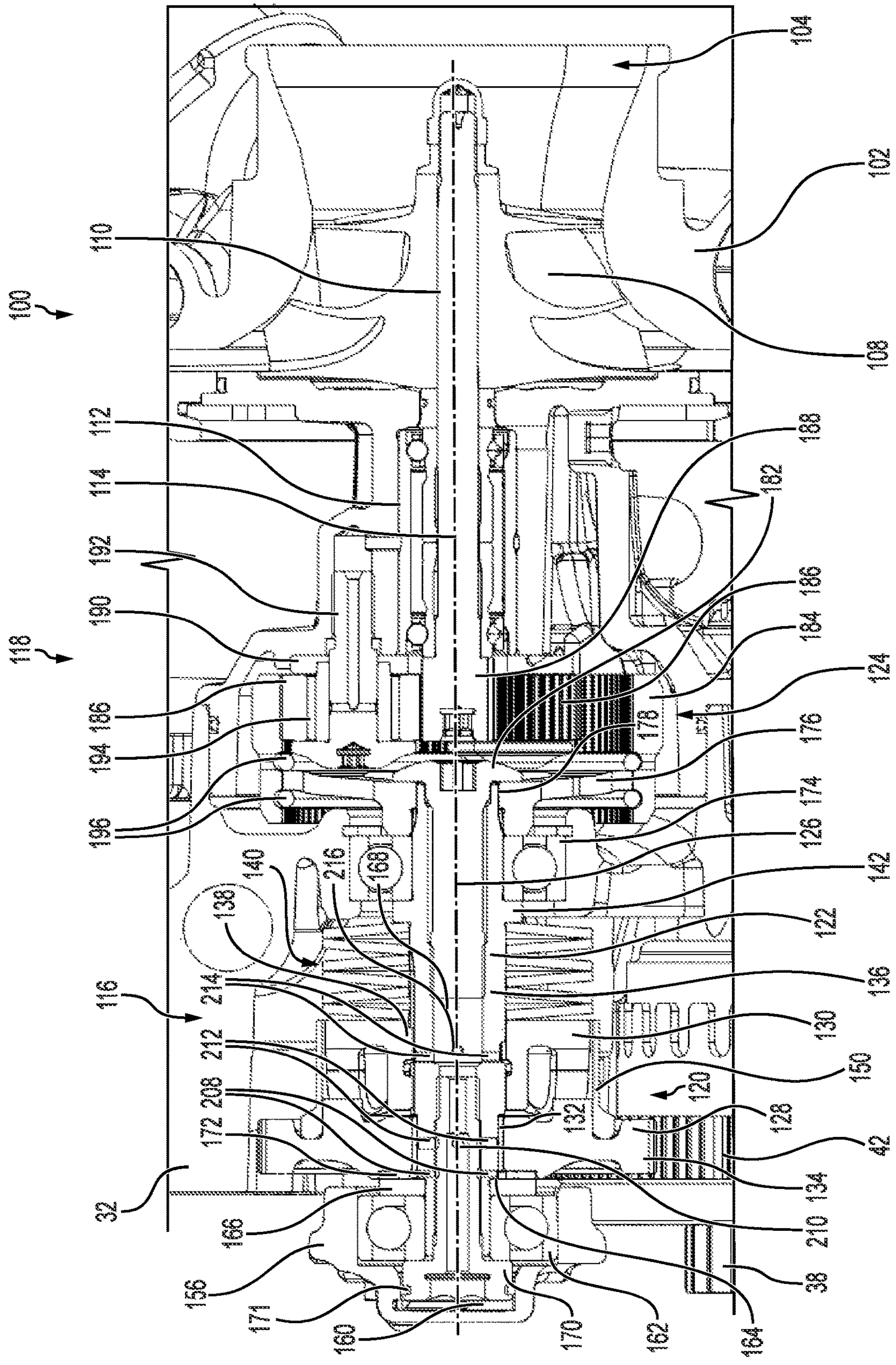
FIG. 6 is a close-up of the cross-section of FIG. 5 showing the supercharger assembly in more detail.
Figure 7:
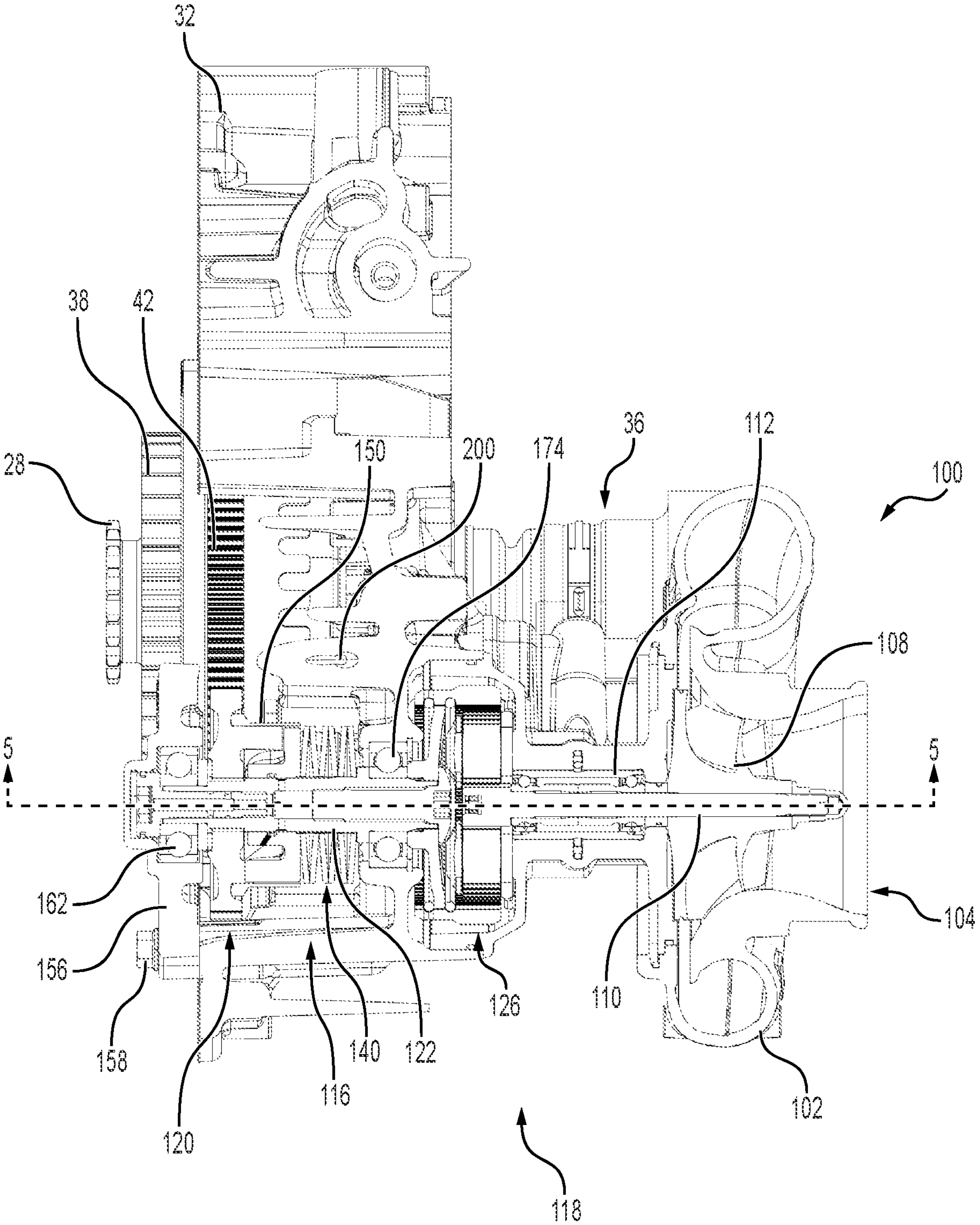
FIG. 7 is a cross-section of the components of FIG. 4 taken through line 7-7 of FIG. 5.

With reference to FIG. 6, a bearing 162 is disposed radially between the front end of the driveshaft 122 and the cover 156 for rotationally supporting the front end of the driveshaft 122 in the cover 156. The bearing 162 is a ball bearing in the present embodiment. The driving member 128 is disposed axially between the bearing 162 and the driven member 130. The driveshaft 122 defines a step 164. A washer 166 is disposed axially between the step 164 and the inner race of the bearing 162. The driveshaft 122 defines an axial passage 168. A hollow fastener 170 is fastened to the front end of the driveshaft 122 and extends in the axial passage 168 of the driveshaft 122. The hollow fastener 170 is a threaded fastener. As can be seen in FIG. 6, the bearing 162 is held axially between a head of the fastener 170 and the washer 166, and therefore between the head of the fastener 170 and the step 164 of the driveshaft 122. A sealing ring 171 is disposed in a groove defined in the head of the fastener 170. The sealing ring 171 provides a seal between the head of the fastener 170 and the cover 156. The head of the fastener 170 and the sealing ring 171 define, together with the cover 156, the oil chamber 160. A friction disc 172 is disposed axially between the driving member 128 and the bearing 162. More specifically, the friction disc 172 is disposed axially between the front of the driving member 128 and the back of the washer 166. The friction disc 172 helps prevent wear of the driving member 128 caused by the relative rotation between the driving member 128 and the washer 166.

A bearing 174 is disposed radially between a rear portion of the driveshaft 122 and the rear housing 32 for rotationally supporting the rear portion of the driveshaft 122 in the rear housing 32. The driven member 130 is disposed axially between the bearing 174 and the driving member 128. A flange 176 is disposed over a rear of the driveshaft 122. The flange 176 has internal splines 178 engaging external splines 180 (FIG. 12) defined on the rear end of the driveshaft 122, thereby rotationally fixing the flange 176 to the driveshaft 122. A fastener 182 is fastened to the rear end of the driveshaft 122 and extends in the axial passage 168 of the driveshaft 122. The fastener 182 is a threaded fastener. As can be seen in FIG. 6, the bearing 174 and the flange 176 are held axially between a head of the fastener 182 and the back of the flange 142 defined by the driveshaft 122.

With reference to FIG. 11, the planetary gear assembly 124 has a ring gear 184, the planet gears 186 and a sun gear 188. In the present embodiment, the sun gear is integrally formed with the front end of the impeller shaft 110, but it is contemplated that the sun gear 188 could be a part separate from the impeller shaft 110 and connected to the front end of the impeller shaft 110. As shown in FIG. 6 for one of the planet gears 186, each of the planet gears 186 is rotationally connected to a planet carrier 190 by a threaded fastener 192 and a bushing 194. The threaded fasteners 192 also connect the planet carrier 190 to the supercharger housing 102 such that the planet carrier 190 is rotationally fixed. The planet gears 186 are disposed radially between and engage the ring gear 184 and the sun gear 188. It is contemplated that the planetary gear assembly 124 could have more or less planet gears 186. The flange 176 has external teeth that engage internal teeth of the ring gear 184 thereby connecting the rear end of the driveshaft 122 to the radially inner side of the ring gear 184. As such, the driveshaft 122 drives the impeller shaft 110 via the flange 176 and the planetary gear assembly 124. In the present embodiment, the impeller shaft 110 rotates five times faster than the driveshaft 122, but it is contemplated that the planetary gear assembly 124 could have a different gear ratio. The contour of the flange 176 is disposed axially between two circlips 196 provided in the ring gear 184. The circlips 196 allow for some axial play between the flange 176 and the ring gear 184.

The lubrication of the components of the drive assembly 116 will now be described with reference to FIGS. 6 to 9.

The oil pump 34 supplies oil to an oil supply passage 200 (FIGS. 7 and 8) defined in the rear housing 32. From the oil supply passage 200, oil flows into an oil supply passage 202 (FIG. 9) which is also defined in the rear housing 32. As can be seen, the right fastener 158 extends in the oil supply passage 202. With reference to FIG. 9, from the oil supply passage 202, oil flows into an oil supply passage 204 defined in the cover 156. From the oil supply passage 204, oil flows into the oil chamber 160 defined by the cover 156, the head of the fastener 170 and the sealing ring 171. From the oil chamber 160, the oil flows axially through the hollow fastener 170 and into the axial passage 168 of the driveshaft 122. Due to the volume of the oil chamber 160, oil is fed to the hollow fastener 170 and the driveshaft 122 under pressure which assists in the proper lubrication of the components of the drive assembly 116.

Figure 8:
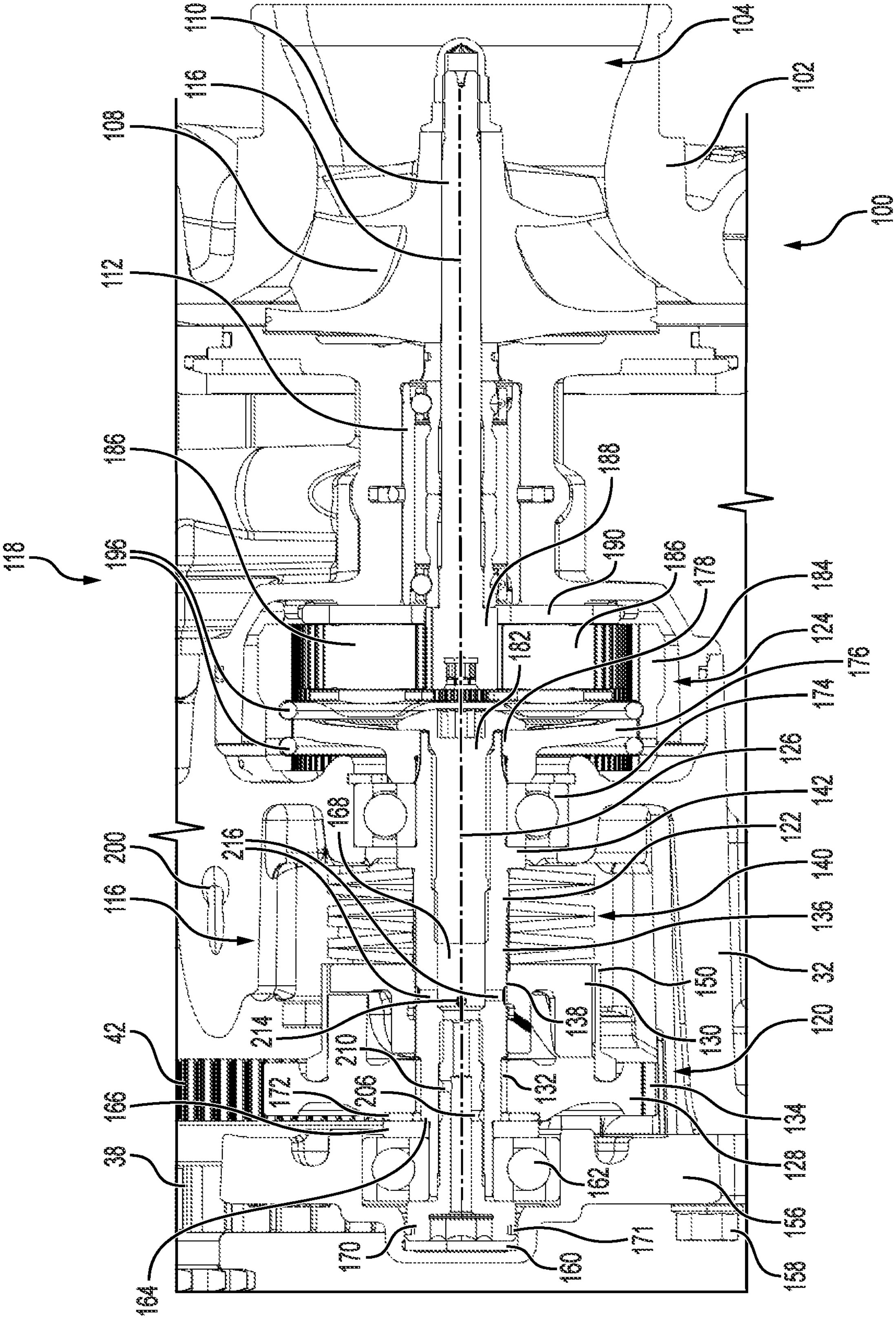
FIG. 8 is a close-up of the cross-section of FIG. 7 showing the supercharger assembly in more detail.
Figure 9:
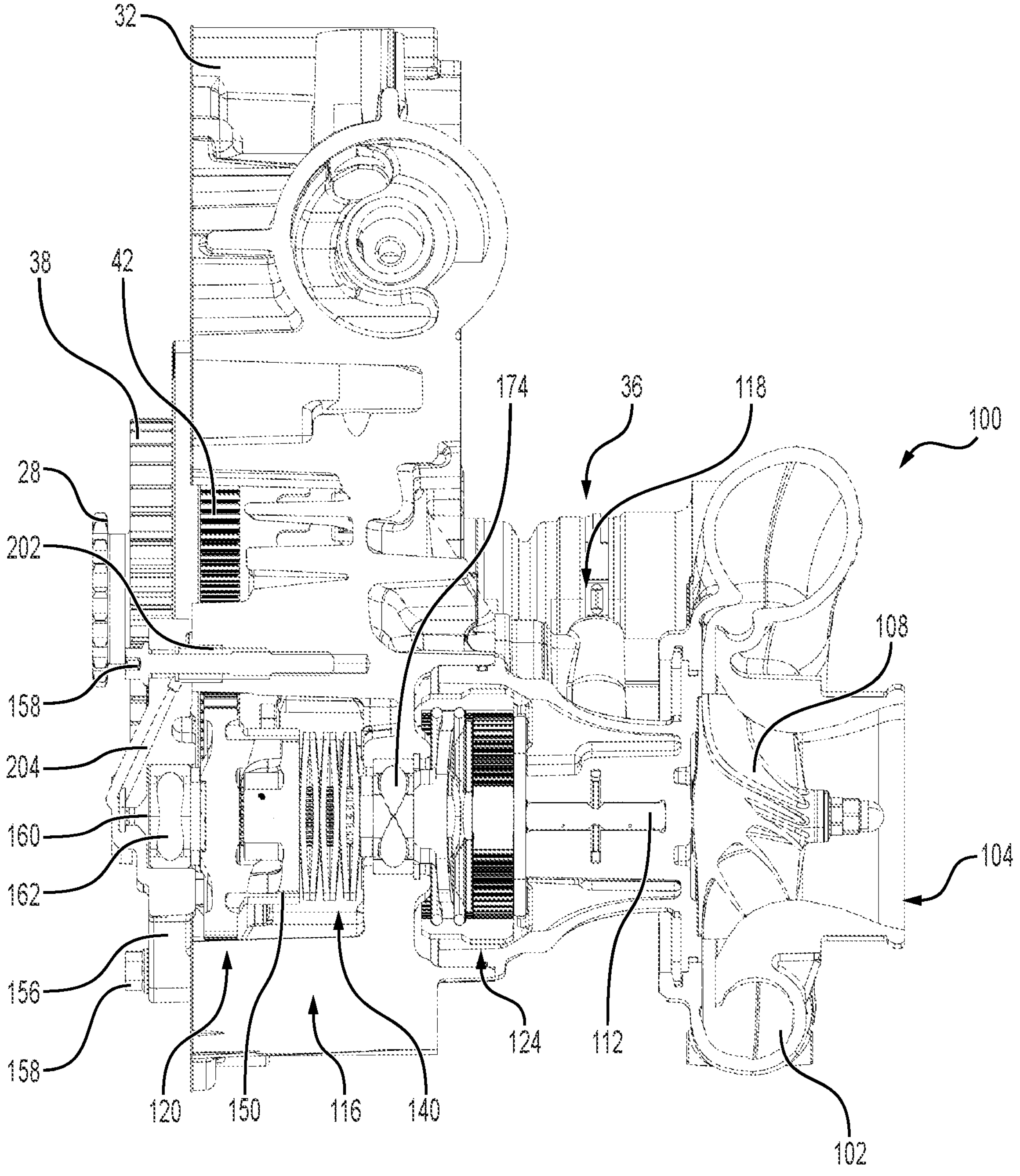
FIG. 9 is a cross-section of the components of FIG. 4 taken through line 9-9 of FIG. 5.
Figure 10:
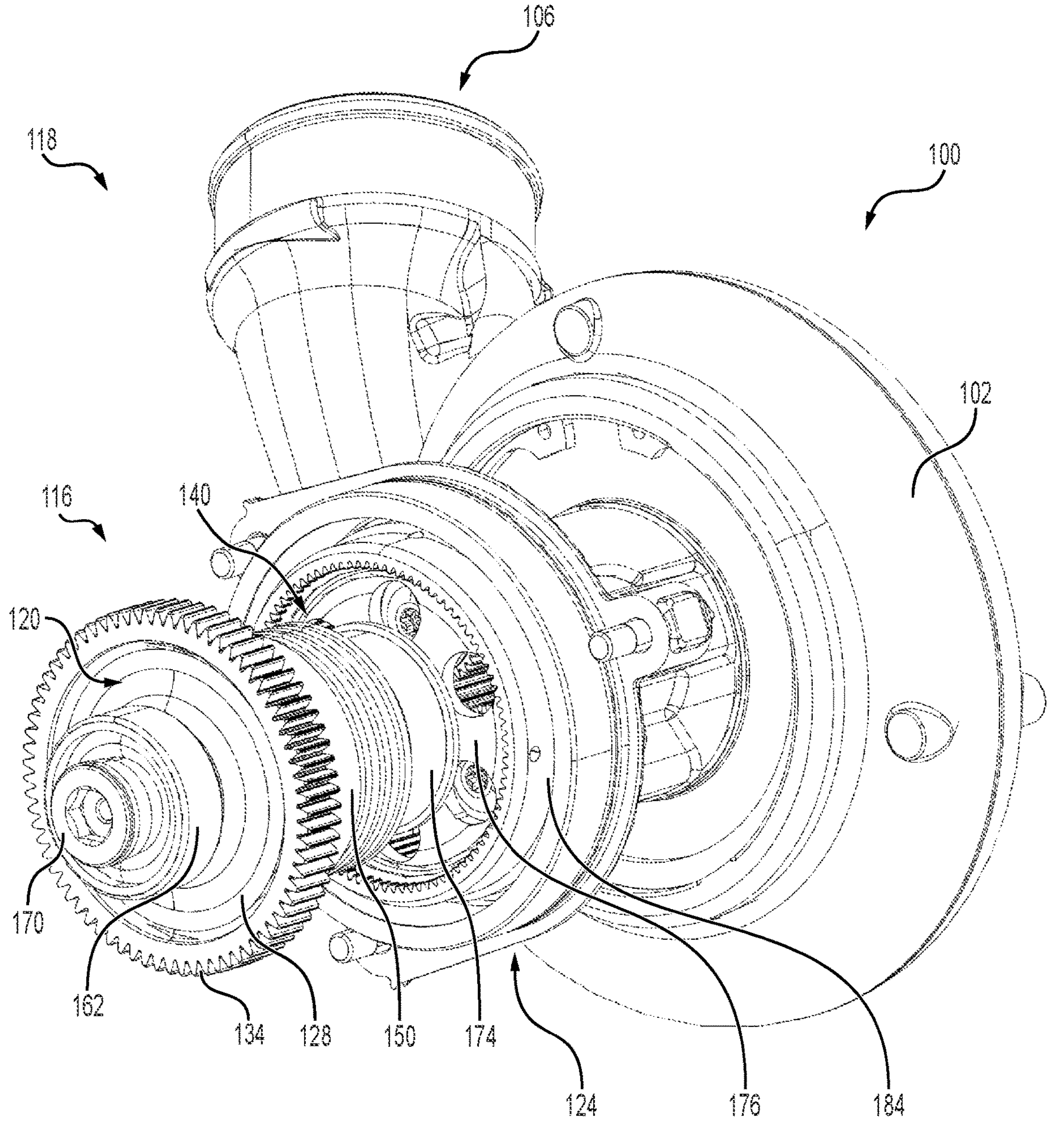
FIG. 10 is a perspective view taken from a front, left side of components of the supercharger assembly of FIG. 4.

With reference to FIG. 8, the hollow fastener 170 defines a radial oil supply passage 206 that is axially aligned with the friction disc 172. With reference to FIG. 6, the driveshaft 122 defines two radial oil supply passages 208 that are positioned to supply oil to the friction disc 172. More specifically, the oil supply passages 208 are axially aligned with the friction disc 172 and with the oil supply passage 206. The oil supply passages 208 are angularly offset from the oil supply passage 206. Oil flows from the center of the hollow fastener 170, through the oil supply passage 206, and through the oil supply passages 208 to supply oil to the friction disc 172 in order to lubricate the interface between the friction disc 172 and the driving member 128 and the interface between the friction disc 172 and the washer 166. It is contemplated that there could be more than one oil supply passage 206. It is contemplated that there could be only one or more than two oil supply passages 208. It is contemplated that the oil supply passage 206 and/or the oil supply passages 208 could extend diagonally instead of just radially.

With reference to FIG. 8, the hollow fastener 170 defines a radial oil supply passage 210 that is axially aligned with an axial center of the plain bearing 132. The radial oil supply passage 210 is angularly offset from the radial oil supply passage 206 by 180 degrees. With reference to FIG. 6, the driveshaft 122 defines two radial oil supply passages 212 that are positioned to supply oil to the plain bearing 132. More specifically, the oil supply passages 212 are axially aligned with the axial center of the plain bearing 132 and with the oil supply passage 210. The oil supply passages 212 are angularly offset from the oil supply passage 210. Oil flows from the center of the hollow fastener 170, through the oil supply passage 210, and through the oil supply passages 212 to supply oil to the plain bearing 132 in order to lubricate the plain bearing 132. It is contemplated that there could be more than one oil supply passage 210. It is contemplated that there could be only one or more than two oil supply passages 212. It is contemplated that the oil supply passage 210 and/or the oil supply passages 212 could extend diagonally instead of just radially.

With reference to FIG. 6, the driveshaft 122 defines two radial oil supply passages 214 and two radial oil supply passages 216. The two radial oil supply passages 214 are angularly opposite each other. The two radial oil supply passages 216 are angularly opposite each other. The two radial oil supply passages 214 are angularly offset from the radial oil supply passages 216 by 90 degrees. The oil supply passages 214 are slightly more axially forward than the oil supply passages 216. The oil supply passages 214, 216 are positioned to supply oil to the torsional damper 120. More specifically, oil supply passages 214, 216 are axially aligned with the driven member 130. Oil flows from the axial passage 168 of the driveshaft 122 through the oil supply passages 214, 216 to supply oil to the interface between the internal splines 138 of the driven member 130 and the external splines 136 of the driveshaft 122. It is contemplated that there could be more or less than four oil supply passages 214, 216 total. It is contemplated that the oil supply passages 214 and/or the oil supply passages 216 could extend diagonally instead of just radially.

Due to the centrifugal forces generated by the rotation of the torsional damper 120, oil flows radially outward from the interface between the internal splines 138 of the driven member 130 and the external splines 136 of the driveshaft 122 and flows over the different surfaces of the driving and driven members 128, 130, including the ends of the arms 146 and the surfaces 148 of the recesses 144. As the oil continues to flow radially outward, it eventually escapes the torsional damper 120, but is intercepted by the sleeve 150, thus preventing the oil from being flung off the torsional damper 120. The intercepted oil can therefore continue to lubricate the torsional damper 120. The oil eventually flows rearward radially between the driven member 130 and the sleeve 150 and comes off the rear end of the sleeve 150. This oil then falls by gravity down in the rear housing 32 and eventually makes its way back to the oil pump 34.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A supercharger assembly comprising:

a supercharger housing defining an air inlet and an air outlet;

an impeller disposed in the supercharger housing;

an impeller shaft connected to the impeller for driving the impeller;

a driveshaft connected to the impeller shaft for driving the impeller shaft, the driveshaft defining an oil supply passage; and a torsional damper connected to the driveshaft for driving the driveshaft, the torsional damper being configured for being operatively connected to a crankshaft of an internal combustion engine, the torsional damper comprising:

a driving member configured for being operatively connected to the crankshaft of the internal combustion engine; and a driven member engaging the driving member, the driven member being connected to the driveshaft, the driving member and the driven member being rotationally movable relative to each other, the driving member and the driveshaft being rotationally movable relative to each other, the driven member being rotationally fixed to the driveshaft, the driveshaft extending through the driving member, the oil supply passage being positioned to supply oil to the torsional damper for lubricating the torsional damper; and a plain bearing disposed radially between the driveshaft and the driving member, the driveshaft defining another oil supply passage, the other oil supply passage being positioned to supply oil to the plain bearing for lubricating the plain bearing.

2. The supercharger assembly of claim 1, further comprising a sleeve disposed around a portion of the torsional damper, the portion of the torsional damper being disposed radially between the sleeve and the driveshaft, the sleeve being positioned to intercept oil escaping from the torsional damper.

3. The supercharger assembly of claim 1, further comprising a hollow fastener fastened to an end of the driveshaft and extending in the driveshaft; and wherein the hollow fastener defines an oil supply passage for supplying oil to the other oil supply passage.

4. The supercharger assembly of claim 1, further comprising:

a first bearing connected to the driveshaft, the driving member being disposed axially between the first bearing and the driven member; and a second bearing connected to the driveshaft, the driven member being disposed axially between the second bearing and the driving member.

5. The supercharger assembly of claim 4, further comprising a friction disc disposed axially between the driving member and the first bearing; and wherein the driveshaft defines another oil supply passage, the other oil supply passage being positioned to supply oil to the friction disc for lubricating the friction disc.

6. The supercharger assembly of claim 1, further comprising a planetary gear assembly operatively connecting the driveshaft to the impeller shaft.

7. The supercharger assembly of claim 6, wherein the planetary gear assembly comprises a ring gear; and further comprising a flange connecting an end of the driveshaft to a radially inner side of the ring gear.

8. An internal combustion engine comprising:

at least one piston;

a crankshaft operatively connected to the piston; and the supercharger assembly of claim 1, the crankshaft being operatively connected to the torsional damper.

9. A supercharger assembly comprising:

a supercharger housing defining an air inlet and an air outlet;

an impeller disposed in the supercharger housing;

an impeller shaft connected to the impeller for driving the impeller;

a driveshaft connected to the impeller shaft for driving the impeller shaft, the driveshaft defining an oil supply passage;

a torsional damper connected to the driveshaft for driving the driveshaft, the torsional damper being configured for being operatively connected to a crankshaft of an internal combustion engine, the torsional damper comprising:

a driving member configured for being operatively connected to the crankshaft of the internal combustion engine; and a driven member engaging the driving member, the driven member being connected to the driveshaft, the driving member and the driven member being rotationally movable relative to each other, the driving member and the driveshaft being rotationally movable relative to each other, the driven member being rotationally fixed to the driveshaft, the driveshaft extending through the driving member;

the oil supply passage being positioned to supply oil to the torsional damper for lubricating the torsional damper; and a cover disposed over an end of the driveshaft, the cover defining an oil chamber fluidly connected to an oil pump of the internal combustion engine to receive pressurized oil from the oil pump, the driveshaft defining an axial passage fluidly communicating the oil chamber with the oil supply passage to supply oil from the oil chamber to the oil supply passage.

10. The supercharger assembly of claim 9, further comprising a bearing connected radially between the end of the driveshaft and the cover for rotationally supporting the end of the driveshaft in the cover.

11. The supercharger assembly of claim 10, further comprising a hollow fastener fastened to the end of the driveshaft and extending in the axial passage of the driveshaft; and wherein:

the hollow fastener has a head;

the driveshaft defines a step; and the bearing is held axially between the head of the fastener and the step of the driveshaft.

12. A supercharger assembly comprising:

a supercharger housing defining an air inlet and an air outlet;

an impeller disposed in the supercharger housing;

an impeller shaft connected to the impeller for driving the impeller:

a driveshaft connected to the impeller shaft for driving the impeller shaft, the driveshaft defining an oil supply passage;

a torsional damper connected to the driveshaft for driving the driveshaft, the torsional damper being configured for being operatively connected to a crankshaft of an internal combustion engine, the torsional damper comprising:

a driving member configured for being operatively connected to the crankshaft of the internal combustion engine; and a driven member engaging the driving member, the driven member being connected to the driveshaft, the driving member and the driven member being rotationally movable relative to each other;

the driving member and the driveshaft being rotationally movable relative to each other:

the driven member being rotationally fixed to the driveshaft, the driven member being axially movable relative to the driveshaft and relative to the driving member, the oil supply passage being positioned to supply oil to the torsional damper for lubricating the torsional damper; and a biasing member biasing the driven member axially toward the driving member.

13. The supercharger assembly of claim 12, wherein the biasing member is at least one disc spring.

14. The supercharger assembly of claim 12, further comprising a sleeve disposed around a portion of the torsional damper, the portion of the torsional damper being disposed radially between the sleeve and the driveshaft, the sleeve being positioned to intercept oil escaping from the torsional damper; and wherein the sleeve is connected to the driving member, and is axially and rotationally fixed relative to the driving member.

15. The supercharger assembly of claim 12, further comprising a sleeve disposed around a portion of the torsional damper, the portion of the torsional damper being disposed radially between the sleeve and the driveshaft, the sleeve being positioned to intercept oil escaping from the torsional damper;

wherein:

one of the driving member and the driven member defines a plurality of recesses;

another one of the driving member and the driven member defines a plurality of arms received in the plurality of recesses;

the plurality of arms slide along surfaces of the plurality of recesses as the driven member rotates relative to the driving member; and the sleeve is disposed around the plurality of recesses and the plurality of arms.

16. The supercharger assembly of claim 12, further comprising a planetary gear assembly operatively connecting the driveshaft to the impeller shaft.

17. The supercharger assembly of claim 16, wherein the planetary gear assembly comprises a ring gear; and further comprising a flange connecting an end of the driveshaft to a radially inner side of the ring gear.

18. An internal combustion engine comprising:

at least one piston;

a crankshaft operatively connected to the piston; and the supercharger assembly of claim 12, the crankshaft being operatively connected to the torsional damper.

19. The internal combustion engine of claim 18, further comprising an oil pump operatively connected to the crankshaft, the oil pump supplying oil to the oil supply passage.

20. The internal combustion engine of claim 18, wherein the supercharger assembly further comprises a sleeve disposed around a portion of the torsional damper, the portion of the torsional damper being disposed radially between the sleeve and the driveshaft, the sleeve being positioned to intercept oil escaping from the torsional damper.

* * * * *